United States Patent [19]

French

[11] Patent Number: 4,644,430
[45] Date of Patent: Feb. 17, 1987

[54] SLOTTED SENSOR IN YOKE-TYPE MAGNETO-RESISTIVE HEAD

[75] Inventor: William French, Cardiff-by-the-Sea, Calif.

[73] Assignee: Eastman Kodak Company, Rochester, N.Y.

[21] Appl. No.: 644,894

[22] Filed: Aug. 27, 1984

[51] Int. Cl.⁴ ............................................ G11B 5/127
[52] U.S. Cl. .................. 360/113; 338/32 R; 360/115
[58] Field of Search ............... 360/113, 115, 125, 119; 338/32 R; 324/252

[56] References Cited

U.S. PATENT DOCUMENTS

| | | | |
|---|---|---|---|
| 3,731,007 | 5/1973 | Masuda et al. | 360/113 |
| 3,845,503 | 10/1974 | Kanai | 360/115 |
| 4,047,236 | 9/1977 | Lee | 360/113 |
| 4,343,026 | 8/1982 | Griffith et al. | 360/113 |
| 4,388,662 | 6/1983 | Jeffers et al. | 360/113 |
| 4,477,794 | 10/1984 | Nomura et al. | 360/113 X |
| 4,555,740 | 11/1985 | Jackson et al. | 360/113 |

FOREIGN PATENT DOCUMENTS

| | | | |
|---|---|---|---|
| 0208622 | 12/1982 | Japan | 360/113 |
| 0045619 | 3/1983 | Japan | 360/113 |
| 0100217 | 6/1983 | Japan | 360/113 |
| 0036320 | 2/1984 | Japan | 360/113 |

Primary Examiner—Robert S. Tupper
Assistant Examiner—Andrew L. Sniezek
Attorney, Agent, or Firm—Robert F. Cody

[57] ABSTRACT

A multitrack magneto-resistive head is comprised of an array of thin-film yoke-type core structures. In the back gap of each such core structure, there is a sense-current-carrying magneto-resistive flux responsive element. To prevent excessive sense current flow, and insensitivity as caused thereby, the invention teaches that slotting of the magneto-resistive element in the region thereof where such element connects into such back gap will alleviate both such problems.

20 Claims, 5 Drawing Figures

SLOTTED SENSOR IN YOKE-TYPE MAGNETO-RESISTIVE HEAD

BACKGROUND OF THE INVENTION

1. Field Of The Invention

This invention relates in general to magnetic flux sensing apparatus and, in particular, to a magnetic head of the type employing a thin single domain magnetic film structure as a magneto-resistive element responsive to the flux being sensed.

2. Background Relative To The Prior Art

Playback of recorded signals from a magnetic recording medium by means of a conventional magnetic head that is sensitive to flux rate-of-change is difficult for low recorded signal frequencies, and theoretically impossible for recorded DC signals, or when there is no relative speed between the recording medium and the magnetic head. Accordingly, various techniques have been proposed for sensing magnetic flux, as opposed to the rate-of-change of such flux, e.g. Hall effect, flux gate, and magneto-resistive devices, thereby to permit recording media to be used as optimally as possible.

With regard to the matter of magneto-resistive devices for sensing magnetic fields, the use of a thin single domain magnetic film for field sensing purposes is known. Representative prior art depicting the use of magneto-resistive thin-film structures can be found in the following references: U.S. Pat. Nos. 3,731,007; 3,947,889; 3,921,218; 3,945,038; 4,051,542; and 4,413,296. Typically, a thin (planar) single domain magneto-resistive film is employed to sense a magnetic field to which it is exposed by passing an electrical sense current (either AC or DC) through the film, the film magnetization vector being canted with respect to the direction of current flow. The field being sensed exerts a torque on the magnetic moment of the film, causing the resistance of the film to increase or decrease depending on the sense and magnitude of the field applied to the film. The resistance of the film is, therefore, the analog of the field strength.

There are, within the prior art, two general types of thin-film magneto-resistive heads: those in which an edge of a magneto-resistive element is adapted to ride along the surface of a magnetic recording medium to pick up magnetic signals recorded thereon; and those in which a medium-contacting structure in a magnetic yoke (or similar element) carries recorded signal flux away from a magnetic recording medium and applies such flux to a thin-film magneto-resistive element disposed in a given region of the yoke (or similar element). The invention, as will appear below, is directed exclusively to improvements in and to the latter type thin-film magneto-resistive head, hereinafter referred to as a yoke-type magnetic head.

To provide appreciation for operating problems associated with yoke-type magneto-resistive heads, as well as to facilitate understanding of the invention, reference is made to the accompanying figures of which:

FIG. 1 is a schematic view, in perspective, of a prior art yoke-type magneto-resistive head adaptable to the practice of the invention, FIGS. 2 and 3 are diagrammatic views useful in teaching the practice of the invention, FIG. 4 is a perspective view of another form of yoke-type magneto-resistive head, such head embodying the invention, and FIG. 5 is a plan view of a presently preferred magneto-resistive element useful in the practice of the invention.

Referring to FIG. 1, a typical prior art multitrack yoke-type magneto-resistive playback head is shown having a ferrite substrate 10 and a succession of thin-film core structures 12 deposited thereon. Only one core structure 12 is depicted in FIG. 1 with "unbroken" lines—the others being in phantom—because all such core structures work in exactly the same way; thus, to understand the way in which the "full-line" core structure 12 works is to understand how all such core structures work.

As indicated, the core structure 12 comprises first and second spaced apart permeable film members 14, 16, typically of permalloy. By virtue of means (usually a thin film of $SiO_2$) not depicted in FIG. 1, the permeable film member 14, together with the ferrite substrate 10, forms a transducer gap 18. The permeable film member 16, on the other hand, contacts the ferrite substrate 10 at 20, thereby to provide a magnetic short circuit from the permeable film member 16 to the ferrite substrate 10.

A thin single domain magneto-resistive film 22 bridges the space 24, i.e. the back-gap, between the permeable film members 14, 16 and is magnetically short circuited to such members at 26, 28. Signal flux which enters the transducer gap 18 is, therefore, forced to traverse the thin single domain magneto-resistive film 22 as the flux completes its loop via the ferrite substrate 10. As is the practice, the easy axis magnetization vector 30 of the magneto-resistive film 22 is canted (either by a suitable bias field or by a deposition technique employed during formation of the film 22) in the plane of the magneto-resistive film. When signal flux traverses the magneto-resistive film 22, the angle that the magnetization vector 30 makes with respect to the direction of the flow of current—introduced from a source 32—varies accordingly. Current flow, it will be appreciated, is perpendicular to the cross-wise dimension of the back-gap space 24. Attendantly, the resistance of the magneto-resistive film 22 varies as a function of the applied signal flux, thereby causing a current detector 34 to produce an appropriate analog signal.

It will be appreciated that, because the permeable film members 14, 16 are more permeable than the magneto-resistive film 22, little or no signal flux traverses the support regions a, b of the magneto-resistive film 22, i.e. there is virtually no change in resistance in either the regions a or b of the magneto-resistive film 22 in response to signal flux. Thus, not only do these support regions a, b not contribute to the desired magneto-resistive effect, but they give rise to two problems avoided by means of the invention: they cause the head of FIG. 1 to consume excessive power; they decrease the sensitivity of the magneto-resistive film 22 to recorded signal flux.

The Problem of Excessive Power Consumption

Given that the multitrack head of FIG. 1 will be employed to play back signals recorded in a plurality of tightly spaced recording tracks ($tr_1$, $tr_2$, $tr_3$, etc.) of a magnetic medium, it is clear that sense currents (32) should be as small as possible to minimize the generation of heat and problems related thereto. As depicted in the schematic showing of FIG. 2, the resistance of the magneto-resistive film 22 in the support regions a, b thereof are characterized by fixed resistors $R_a$, $R_b$, and only the flux-responsive region c of the magneto-resistive film 22 is characterized by a variable resistor $R_c$. As is known, the total resistance corresponding to $R_a+R_b+R_c$ is less than the resistance of any of the resistors $R_a$, $R_b$, $R_c$; and attendantly a relatively large heat-producing sense current (32) will undesirably flow through the magneto-resistive film 22.

The Problem of Insensitivity to Signal Flux

Given that a large sense current flows through the magneto-resistive film 22 of FIG. 2, any change in the resistance of resistor $R_c$ as caused by signal flux will produce just a small percentagewise change in the magnitude of the sense current (32). For example, assuming that the quiescent current through the resistive network ($R_a$, $R_b$, $R_c$) of FIG. 2 is 100 milliamps, and assuming the resistance of $R_c$ varies in response to signal flux so that current through the resistive network rises to 105 milliamps, the percentage change is a relatively difficult-to-detect 5%.

SUMMARY OF THE INVENTION

By restricting the flow of sense current through the magneto-resistive film to only that region thereof which is susceptible to a resistance change in response to signal flux, the parallel resistive network of FIG. 2 is, in effect, converted to a network comprised of a single variable resistance. Attendantly, the sense current which is drawn greatly reduces, thereby alleviating the problem of heat generation; and, corollarily, the sensitivity to signal flux heightens: assuming the quiescent sense current through the single resistance is reduced to 25 milliamps by virtue of the invention, a 5 milliamp change in current through such resistance corresponds to a comparatively easy-to-detect current change of 20%.

DETAILED DESCRIPTION OF THE INVENTION

Figures 2, 3:
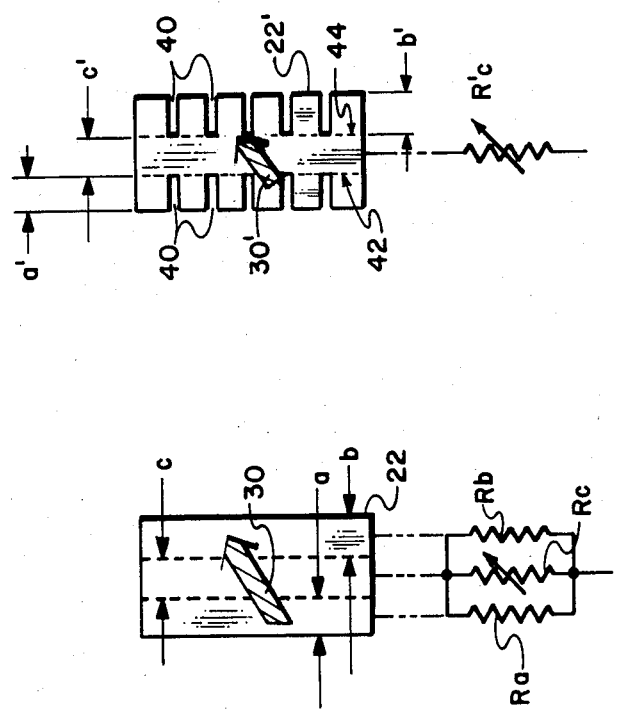

Referring to FIG. 3, a magneto-resistive film 22'( . . . as employed herein, primed notations have been employed to indicate corresponding parts in the various drawings . . . ) according to the invention is provided with a succession of support region (a', b') slots 40 to restrict the flow of sense current to the cetral region c' of the film 22'. With the film 22' of FIG. 3 (as replacement for the magneto-resistie film 22 of FIG. 1) so connected across the space 24 between the permeable film members 14, 16 of FIG. 1 that the supporting tips 42, 44 thereof reside as shown in FIG. 3, the magneto-resistive film 22' corresponds to a single signal-variable resistor R'$_c$. Attendantly, heatproducing sense current!-through the magneto-resistive film 22' is limited; and the sensitivity of the film to signal flux is maximized since such sense current is precluded from traversing the magneto resistive film except in the region thereof that is responsive to signal flux.

As will be appreciated, the slots 40 of the magneto-resistive film 22' may be formed by suitable masking during the formtion of the magneto-resistive film 22'. Concerning the number of slots 40 employed in the practice of the invention, it will be further appreciated that, in general, a larger number of slots is better than a smaller number of slots. The invention, however, may be practiced with only a single slot, although a pair of generally opposing slots on each end of the magneto-resistive film will provide almost as much current reducing effectiveness as the array of slots 40 depicted in FIG. 3.

Figure 1:
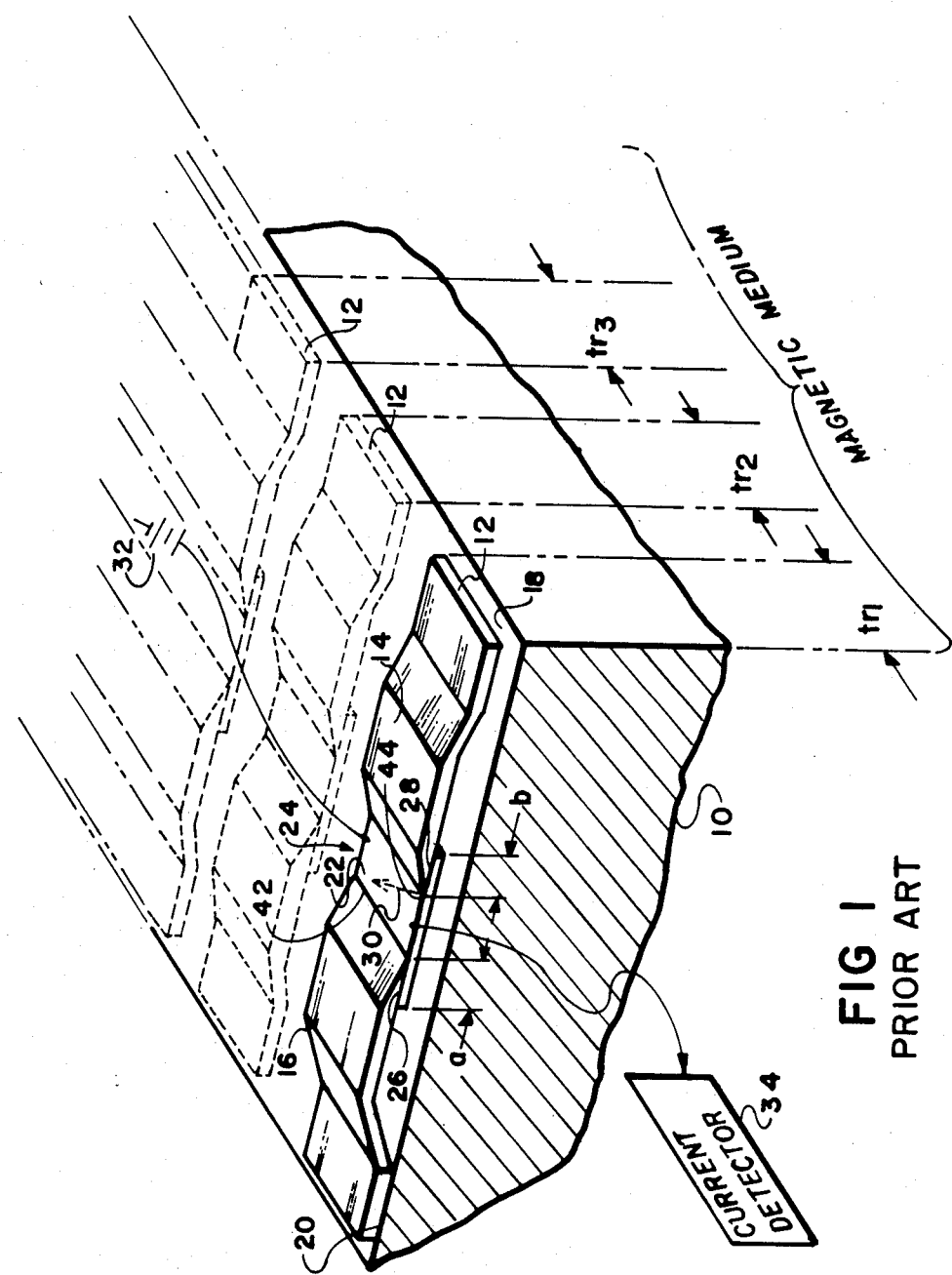
Figure 4:
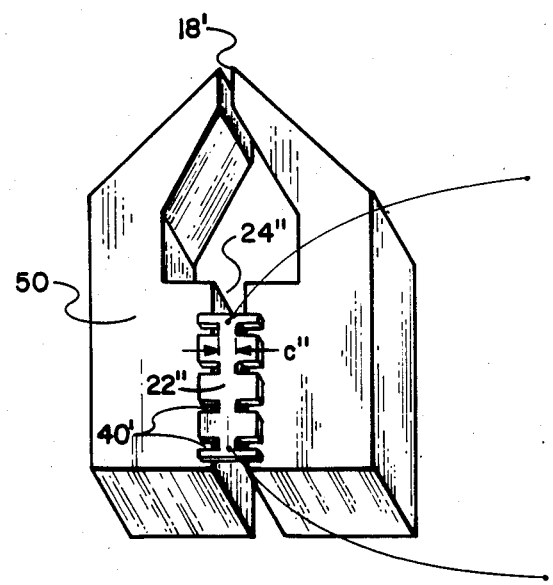

Whereas the invention is depicted in FIG. 1 in association with a multitrack thin-film magnetic head, the invention is just as applicable to other forms of yoke-type magneto-resistive heads. Referring therefore to FIG. 4, a single gapped (18') playback head core 50 has a slotted magneto-resistive film element 22" disposed across its back gap 24". To be noted in FIG. 4 is that the lengths of the slots 40' in the magneto-resistive film 22" are such that the active region c" has been narrowed even more than as shown in FIG. 3. Such a technique may have special application, e.g. when employed with an especially effective flux gathering yoke-structure; and evinces the comparatively broad scope of the invention. In this regard then, it will be further appreciated that the conversion of a "parallel" network of resistances (FIG. 2) to a single resistance (FIG. 3) may also be effected by means other than by the slotting of support regions (a, b): for example, it would be within the scope of the invention to employ electrically non-conductive support regions (a, b)—slotted or otherwise—to restrict current flow through the magneto-resistive film to only that region thereof that is responsive to "back-gap" signal flux.

Figure 5:
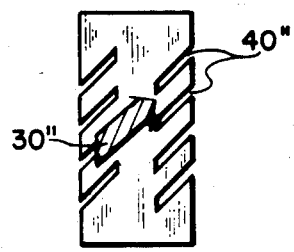

To employ slots which are oriented perpendicular to the direction of sense current flow, i.e. at an angle with respect to the magnetization vector 30 (as in FIG. 3) is to cause the build-up of magnetic "charges" across the opposite sides of the slots 40: Such magnetic charges may exert a demagnetizing influence on the magneto-resistive film 22', and in some instances will need to be precluded. To this end, then, reference should be had to the magneto-resistive film of FIG. 5 which depicts the use of slots 40" that are oriented in the direction of the magnetization vector 30". With the slots 40" so oriented, magnetic charges will not appear across the slots, and demagnetization will be minimal.

The invention has been described in detail with particular reference to certain preferred embodiments thereof, but it will be understood that variations and modifications can be effected within the spirit and scope of the invention.

What is claimed is:

1. In a yoke-type magneto-resistive head having
   (a) a transducer gap, formed by a structure having spaced apart non-comblike edges
   (b) a back gap in said structure remote from said transducer gap, and
   (c) thin magneto-resistive film means bondes to said structure and disposed across the back gap of said head, said film means being adapted to convey a sense current therethrough in a direction that is perpendicular to the cross-wise dimension of said back gap, the improvement comprising means for preventing sense current flow through said magneto-resistive film means except in the region thereof that is responsive to magnetic flux in the back gap of said head said means for preventing being menas extending from where said film means is bonded to said structure to a point disposed within said back gap, whereby sense current flow through said film means is minimized with attendant decrease in power consumption and increase in head sensitivity to magnetic flux sensed by said head.

2. The improved magnetic head of claim 1 wherein said means for substantially preventing sense current flow through said magneto-resistive film except in the region thereof that is responsive to back gap magnetic flux comprises slotted means for connecting said magneto-resistive film across the back gap of said magnetic head.

3. The improved magnetic head of claim 2 wherein said slotted means is provided with a plurality of slots disposed along the length of said magneto-resistive film.

4. The improved magnetic head of claim 3 wherein the slots of said slotted means are oriented at an angle with respect to the general direction of sense current flow through said magneto-resistive film.

5. A yoke-type magneto-resistive head comprising:
    (a) a magnetic substrate,
    (b) first and second spaced apart permeable film members deposited on said substrate, said first permeable film member being non-comb-like and spaced at one end thereof from said substrate to form therewith a transducer gap, and said second permeable film member at one end thereof having good magnetic conductivity into said substrate, and
    (c) elongated thin-film magneto-resistive means connected to, and disposed across the space between, said first and second permeable film members, said magneto-resistive means being so formed that sense current is precluded from coursing the length of said magneto-resistive means in the regions thereof where said magneto-resistive means is connected to said first and second permeable film members.

6. The magneto-resistive head of claim 5 wherein said magneto-resistive means is slotted in the regions thereof where said magneto-resistive means is connected to said first and second permeable film members.

7. The magneto-resistive head of claim 6 wherein said magneto-resistive means is provided with a succession of slots in the regions thereof where said magneto-resistive means is connected to said first and second permeable film members.

8. The magneto-resistive head of claim 7 wherein the succession of slots in said magneto-resistive means are angled with respect to the direction of said sense current flow.

9. The magneto-resistive head of claim 5 wherein
    (a) said substrate is comprised of ferrite material and
    (b) said first and second permeable members are comprised of permalloy.

10. The magneto-resistive head of claim 9 wherein said magneto-resistive means is slotted in the regions thereof where said magneto-resistive means is connected to said first and second permeable film members.

11. The magneto-resistive head of claim 10 wherein said magneto-resistive means is provided with a succession of slots in the regions thereof where said magneto-resistive means is connected to said first and second permeable film members.

12. The magneto-resistive head of claim 11 wherein the succession of slots in said magneto-resistive means are angled with respect to the direction of said sense current flow.

13. A multitrack magneto-resistive head comprising
    (a) a magnetic substrate and
    (b) a plurality of thin-film magnetic head structures formed thereon, each said magnetic head structure comprising
        (1) first and second spaced apart permeable film members, said first film member being non-comb-like and spaced at one end thereof from said substrate to form therewith a transducer gap, and said second permeable film member at one end thereof having good magnetic conductivity into said substrate, and
        (2) elongated thin film magneto-resistive means connected to, and disposed across the space between, said first and second permeable film members, said magneto-resistive means being so formed that sense current through said magneto-resistive means is substantially prevented from travelling the length of said magneto-resistive means in the regions thereof where said magneto-resistive means is connected to said first and second permeable film members.

14. The multitrack magneto-resistive head of claim 13 wherein the magneto-resistive means of each of the plurality of thin-film magnetic head structures is slotted in the regions thereof where said magneto-resistive means is connected to said first and second permeable film members.

15. The multitrack magneto-resistive head of claim 14 wherein the magneto-resistive means of each of the plurality of thin-film magnetic head structures is provided with a succession of slots in the regions thereof where said magneto-resistive means is connected to said first and second permeable film members.

16. The multitrack magneto-resistive head of claim 15 wherein the slots of each said succession of slots are angled with respect to the direction of sense current flow within the respective thin film magneto-resistive means.

17. The multitrack magneto-resistive head of claim 13 wherein
    (a) said substrate is comprised of ferrite material and
    (b) said first and second permeable members of each said thin-film head structure are comprised of permalloy.

18. The multitrack magneto-resistive head of claim 17 wherein the magneto-resistive means of each of the plurality of thin-film magnetic head structures is slotted in the regions thereof where said magneto-resistive means is connected to said first and second permeable film members.

19. The multitrack magneto-resistive head of claim 18 wherein the magneto-resistive means of each of the plurality of thin-film magnetic head structures is provided with a succession of slots in the regions thereof where said magneto-resistive means is connected to said first and second permeable film members.

20. The multitrack magneto-resistive head of claim 19 wherein the slots of each said succession of slots are angled with respect to the direction of sense current flow within the respective thin film magneto-resistive means.

* * * * *